(12) United States Patent
Işin et al.

(10) Patent No.: US 12,433,641 B2
(45) Date of Patent: Oct. 7, 2025

(54) UNILATERAL EXTERNAL FIXATOR APPARATUS AND CONTROL METHOD

(71) Applicants: Şehmuz Işin, Istanbul (TR); Baran Işin, Istanbul (TR); Ikbal Işin, Istanbul (TR)

(72) Inventors: Şehmuz Işin, Istanbul (TR); Baran Işin, Istanbul (TR); Ikbal Işin, Istanbul (TR)

( * ) Notice: Subject to any disclaimer, the term of this patent is extended or adjusted under 35 U.S.C. 154(b) by 0 days.

(21) Appl. No.: 18/470,978

(22) Filed: Sep. 20, 2023

(65) Prior Publication Data

US 2025/0090201 A1 Mar. 20, 2025

(51) Int. Cl.
*A61B 17/66* (2006.01)
*A61B 17/56* (2006.01)
*G06T 17/00* (2006.01)

(52) U.S. Cl.
CPC .............. *A61B 17/66* (2013.01); *A61B 17/56* (2013.01); *G06T 17/00* (2013.01); *A61B 2017/564* (2013.01); *G06T 2207/30008* (2013.01)

(58) Field of Classification Search
CPC ... A61B 17/64; A61B 17/645; A61B 17/6466; A61B 17/6475; A61B 17/66
See application file for complete search history.

(56) References Cited

U.S. PATENT DOCUMENTS

| | | | |
|---|---|---|---|
| 1,367,578 A * | 2/1921 | Ziegler | F16D 3/38 464/134 |
| 5,728,095 A | 3/1998 | Taylor | |
| 5,941,879 A | 8/1999 | Walulik | |
| 5,971,984 A | 10/1999 | Taylor | |
| 7,449,023 B2 | 11/2008 | Walulik | |
| 8,366,710 B2 | 2/2013 | Hirata et al. | |
| 8,388,619 B2 | 3/2013 | Mullaney | |
| 9,642,649 B2 | 5/2017 | Nikonovas | |
| 10,010,346 B2 | 7/2018 | Edelhauser | |

(Continued)

FOREIGN PATENT DOCUMENTS

| | | |
|---|---|---|
| EP | 0814714 B1 | 1/1998 |
| EP | 3069673 B1 | 9/2016 |

(Continued)

*Primary Examiner* — Julianna N Harvey
(74) *Attorney, Agent, or Firm* — Hayes Soloway P.C.

(57) ABSTRACT

A unilateral external fixator ("UEF") and method of controlling the UEF. Apparatus comprises a central body connected to a first base and a second base via joints. Two angular adjustment screw assemblies control position between the central body and the first base. Two additional angular adjustment screw assemblies control position between the central body and the second base. A first axial adjustment screw assembly in the first base adjusts axial position of a first bone attachment base. A second axial adjustment screw in the second base adjusts axial position of a second bone attachment base. Method comprises uploading a first set of x-rays to a computer program, characterizing geometry of a bone deformity with the program, recommending frame geometry for correcting the deformity, then after surgery uploading a second set of x-rays with fixator attached, characterizing geometry again, calculating fixator adjustments necessary to align bones, and providing proposed fixator positions.

5 Claims, 10 Drawing Sheets

(56) References Cited

U.S. PATENT DOCUMENTS

| | | |
|---|---|---|
| 10,194,944 B2 | 2/2019 | Edelhauser |
| 10,258,377 B1 | 4/2019 | Lavi |
| 11,337,732 B2 | 5/2022 | Lavi |
| 2006/0229604 A1* | 10/2006 | Olsen ................. A61B 17/6425 606/54 |
| 2013/0201212 A1 | 8/2013 | Haskell |
| 2016/0022314 A1* | 1/2016 | Bordeaux .............. A61B 17/66 606/56 |
| 2021/0153944 A1 | 5/2021 | Nikonovas |

FOREIGN PATENT DOCUMENTS

| | | | |
|---|---|---|---|
| WO | 2012102685 A1 | 8/2012 | |
| WO | 2014142703 A1 | 9/2014 | |
| WO | WO-2023038595 A1 * | 3/2023 | ............. A61B 17/66 |

* cited by examiner

UNILATERAL EXTERNAL FIXATOR APPARATUS AND CONTROL METHOD

BACKGROUND OF THE INVENTION

Field of the Invention

The invention is in the field of external fixators for gradual and controlled correcting broken bones and other bone deformities.

Description of the Related Art

In various orthopedic surgical procedures, it is necessary to secure two bone portions in a relatively fixed relationship to each other. The need for establishing such secured relationship is often a result of a bone fracture or other type of bone deformity. To ensure that the bone can regenerate in the proper orientation and fuse the fracture, it is important that the bone portions be fixed in the desired position during bone regeneration.

Various external fixators for the correction of bone deformities are known. For example, U.S. Pat. No. 7,449,023 B2 to Walulik et al. discloses a method and apparatus for external fixation and correction of bone using a unilateral fixator. However, using this apparatus is difficult for complex deformities in three dimensions. Surgeons have difficulty foreseeing the bone position in a plane other than that being corrected. For example, one can correct angulation on a frontal plane, and then the bone goes somewhere else on a sagittal plane.

Another example is EP 0814714 B1 to Taylor et al. Taylor teaches a circular fixator having two rings and six struts. It solves some of the problems of Walulik, but causes other problems for surgeons and patients. The hardware is complex and surgeons have difficulty seeing the surgical area due to the struts around the patient's extremity, and it is difficult to manage all the components, which include rings, struts, anchoring elements, and more, during surgery. Patients have difficulty carrying such a bulky device on their extremity. Adjusting strut lengths every day is not easy because at least three struts are outside of the patient's view. Femoral surgeries are very uncomfortable for the patient because the patient cannot get the legs close to one another, which greatly affects the patient's daily life.

What is needed, therefore, is an external fixator that does not have the problems of prior art apparatuses. The fixator should be controllable in multiple planes, positions should be foreseeable to the surgeons, the apparatus should not be bulky and difficult to use in daily life.

SUMMARY OF THE INVENTION

The present invention is a unilateral external fixator ("UEF") and method of controlling the fixator that satisfies these needs. The apparatus comprises a central body connected to a first base and a second base via respective universal joints. Two angulation adjustment screw assemblies control geometrical position between the central body and the first base. Two additional angulation adjustment screw assemblies control geometrical position between the central body and the second base. A first axial adjustment screw in the first base adjusts axial position of a first bone attachment base. A second axial adjustment screw in the second base adjusts axial position of a second bone attachment base.

A method of correcting a bone deformity comprises the steps of providing a UEF, uploading a first set of x-ray images prior to surgery to a computer software program, characterizing the geometry of a bone deformity with the program, recommending a frame type, shape, and geometry of UEF for correcting the deformity. The method further comprises the steps of, after surgery uploading a second set of x-ray images with the fixator attached, characterizing the geometry again, sending the geometry to a correction algorithm of the program, calculating fixator adjustments necessary to align bone segments, providing visualization of aligned bone segments and proposed fixator positions for user approval, and providing a correction animation in three dimensions for correcting the bone deformity using the UEF. These and other benefits, features, and advantages will be made clearer in the accompanying description, claims, and drawings.

DETAILED DESCRIPTION OF THE INVENTION

The apparatus of the present invention is made for fixating fractured bones while making it possible to precisely adjust the relative position and orientation to the needs. The facture could be caused by a trauma or an osteotomy during surgery. The unilateral external fixator ("UEF") offers a very tight package and a wide range of adjustment positions. The challenge, however, is given by the non-linear behavior of the system. The adjustment screws do not correspond to linear motion as in a cartesian motion system. A linear movement, or any movement, requires the simultaneous change of multiple adjustment screws. The numerical method of the present invention achieves desired motion and control both position and orientation.

The UEF is given in two different configurations. The first, basic version allows the manipulation of a given bone structure in five degrees of motion. In particular, it supplies three perpendicular translations and two rotations. The extended, second version of the UEF carries an additional revolute joint, and therefore allows the manipulation of all six degrees of freedom. The method of the invention supplies a numerical solution to control both the position and the orientation of attached bone structures using the UEF.

Figure 1:
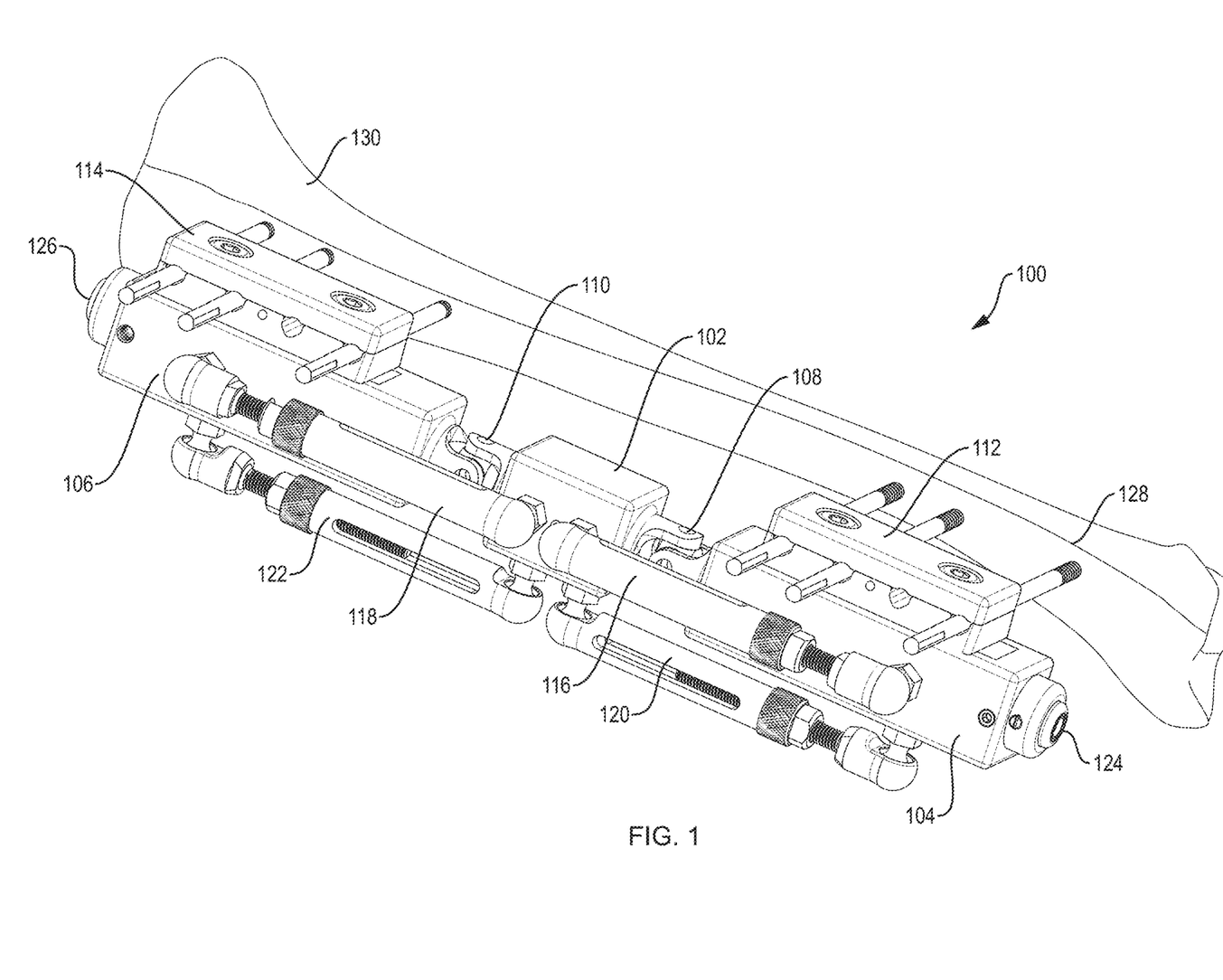
FIG. 1 is a perspective view of a first embodiment of the apparatus of the present invention.

FIG. 1 is a perspective view of a first embodiment of the UEF of present invention, providing five degrees of motion. The UEF assembly 100 comprises a central body 102 and a first base 104 in operative communication with the central body 102 via a first joint 108 disposed on a central body first side. The first joint can be a universal joint or a ball and socket joint. FIG. 1 shows it as a universal joint. A first bone attachment base 112 is fixed to a first longitudinal plane of the first base 104 for attaching the fixator to a lower bone or lower bone mockup 128. A first angulation adjustment screw assembly 116 is connected at a first end to the central body 102 and connected at a second end to the first base 104 along a longitudinal plane orthogonal to the first bone attachment base 112. A third angulation adjustment screw assembly 120 is connected at a first end to the central body 102 at a position orthogonal to that of the first angulation adjustment screw assembly 116 and connected at a second end to the first base 104 at a position orthogonal to that of the first angulation adjustment screw assembly 116. A first axial adjustment screw assembly 124 is in communication with the first base 104 that adjusts translation of the bone attachment 112 along a longitudinal axis of the first base 104.

A second base 106 is in operative communication with the central body 102 via a second joint 110 disposed on a central body second side opposite the central body first side. Like the first joint, the second joint 110 can be a universal joint or a ball and socket joint. FIG. 1 shows it as a universal joint. A second bone attachment base 114 is fixed to a first longitudinal plane of the second base 106 for attaching the fixator to an upper bone or upper bone mockup 130. A second angulation adjustment screw assembly 118 is connected at a first end to the central body 102 and connected at a second end to the second base 106 along a longitudinal plane orthogonal to the second bone attachment base 114. A fourth angulation adjustment screw assembly 122 is connected at a first end to the central body 102 at a position orthogonal to that of the second angulation adjustment screw assembly 118 and connected at a second end to the second base 106 at a position orthogonal to that of the second angulation adjustment screw assembly 118. A second axial adjustment screw 126 is in communication with the second base 106 that adjusts translation of the second bone attachment base 114 along a longitudinal axis of the second base 106.

Figure 2:
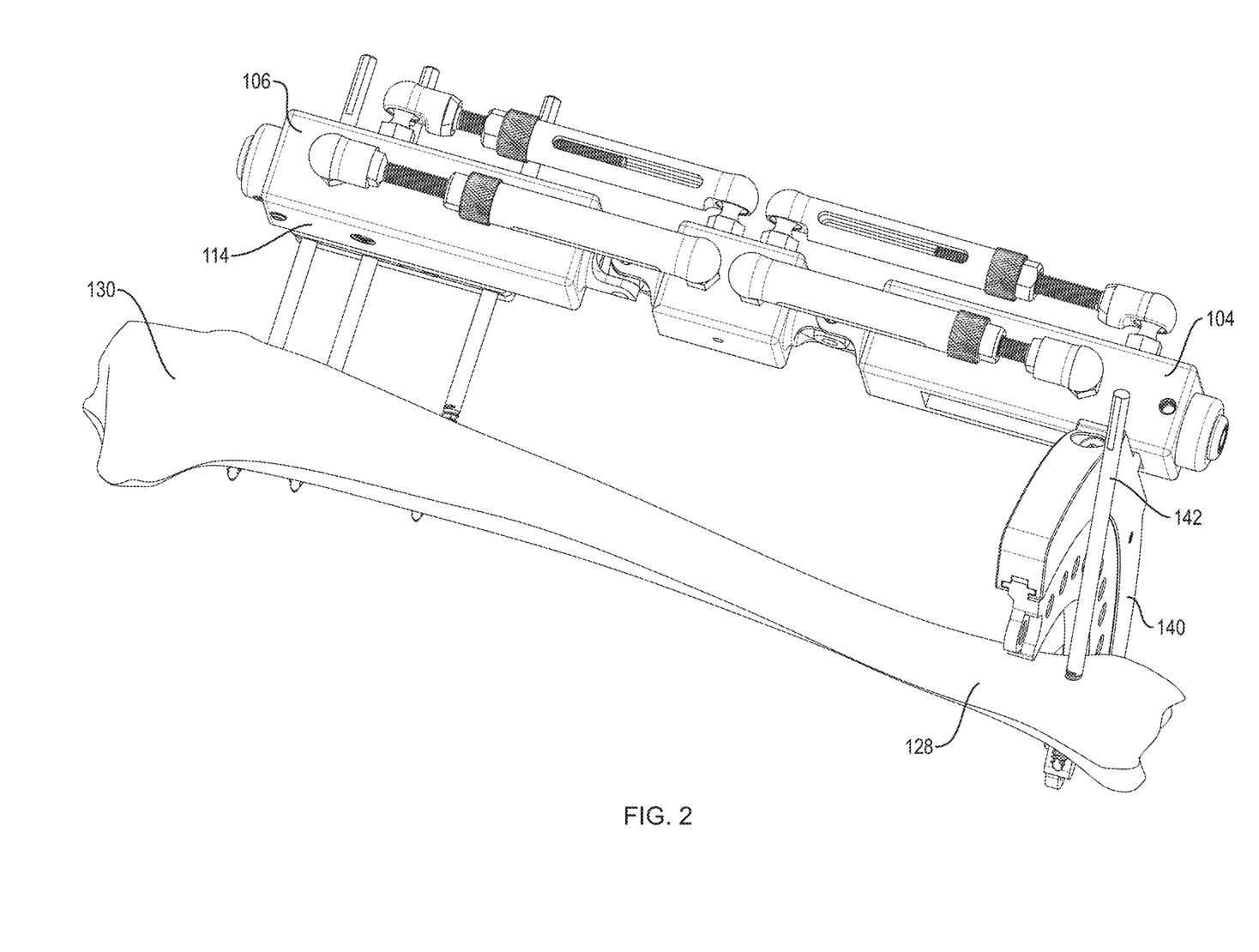
FIG. 2 is a perspective view of a second embodiment of the apparatus of the present invention.

FIG. 2 is a perspective view of a second embodiment of the UEF of present invention, providing six degrees of motion. The UEF assembly of FIG. 2 differs from that of FIG. 1 by replacing the first bone attachment base of FIG. 1 with a rotator assembly 140 fixed to the first base 104. A linking member 142 is adjustably attached to the rotator assembly 140 for attaching to the lower bone 128.

Figure 3:
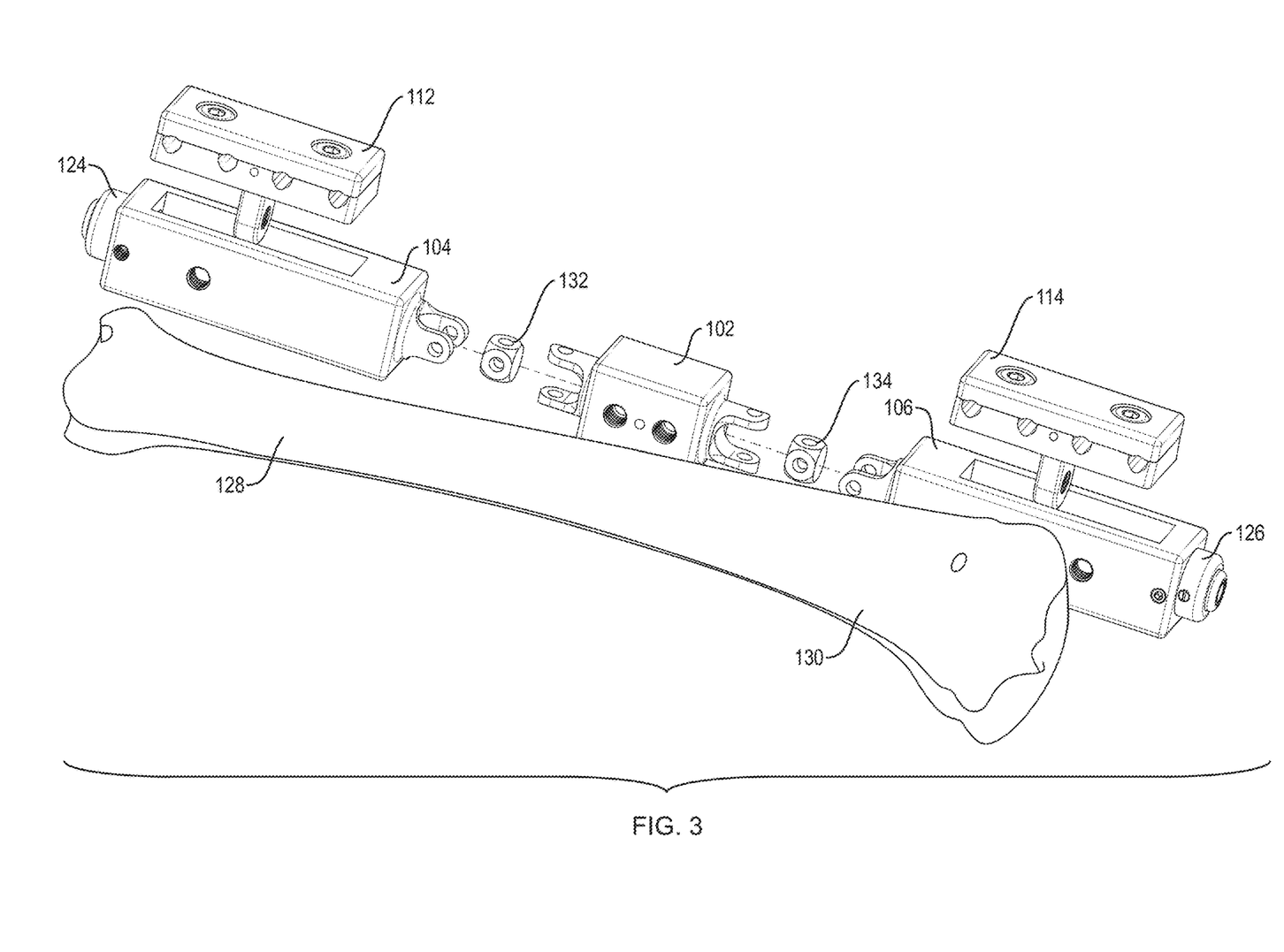
FIG. 3 is an exploded view of the embodiment of FIG. 1.

FIG. 3 is an exploded view of the embodiment of FIG. 1 and shows additional components that are not visible in the view of FIG. 1. A first cross 132 is disposed between the central body 102 and the first base 104, and is part of the first universal joint 108. A second cross 134 is disposed between the central body 102 and the second base 106, and is part of the second universal joint 110.

The first bone attachment base 112 is in sliding communication with the first base 104 and is translated along the longitudinal axis of the first base by adjusting the first axial adjustment screw 124. The second bone attachment base 114 is in sliding communication with the second base 106 and is translated along the longitudinal axis of the second base by adjusting the second axial adjustment screw 126.

Figure 4:
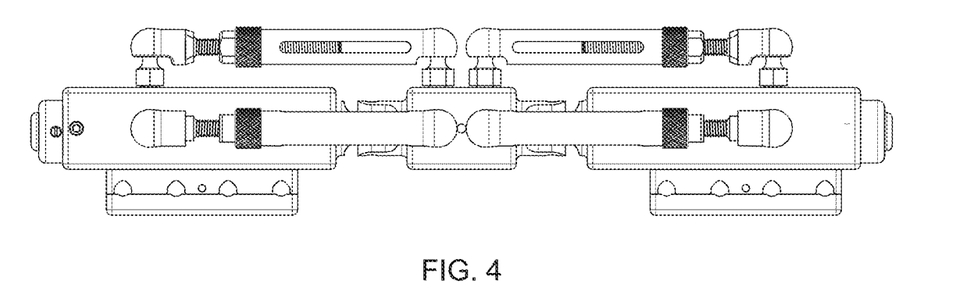
FIG. 4 is a front elevation of the embodiment of FIG. 1.
Figure 5:
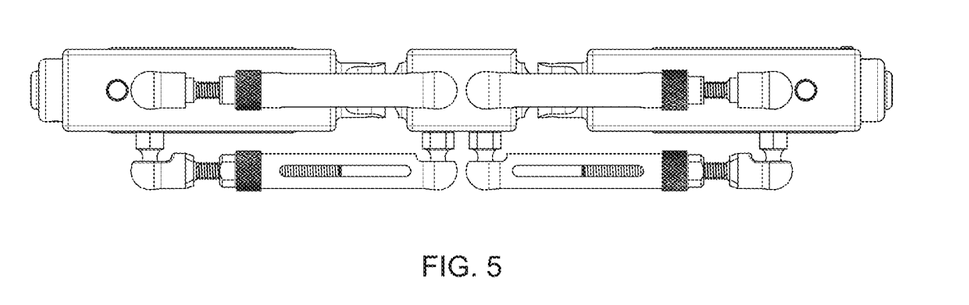
FIG. 5 is a plan view of the embodiment of FIG. 1.
Figure 6:
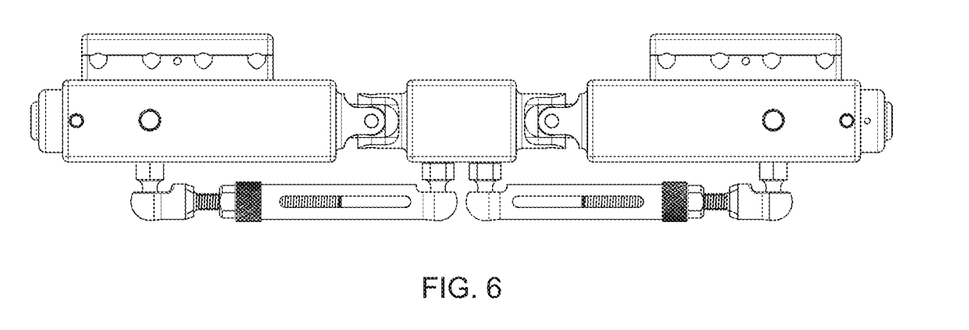
FIG. 6 is a rear elevation of the embodiment of FIG. 1.
Figure 7:
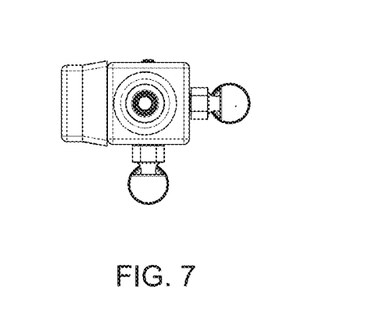
FIG. 7 is a side elevation of the embodiment of FIG. 1.

FIGS. 4-6 show the front elevation, plan view, and rear elevation of the UEF of FIG. 1 respectively. FIG. 7 shows the side elevation.

Figure 8:
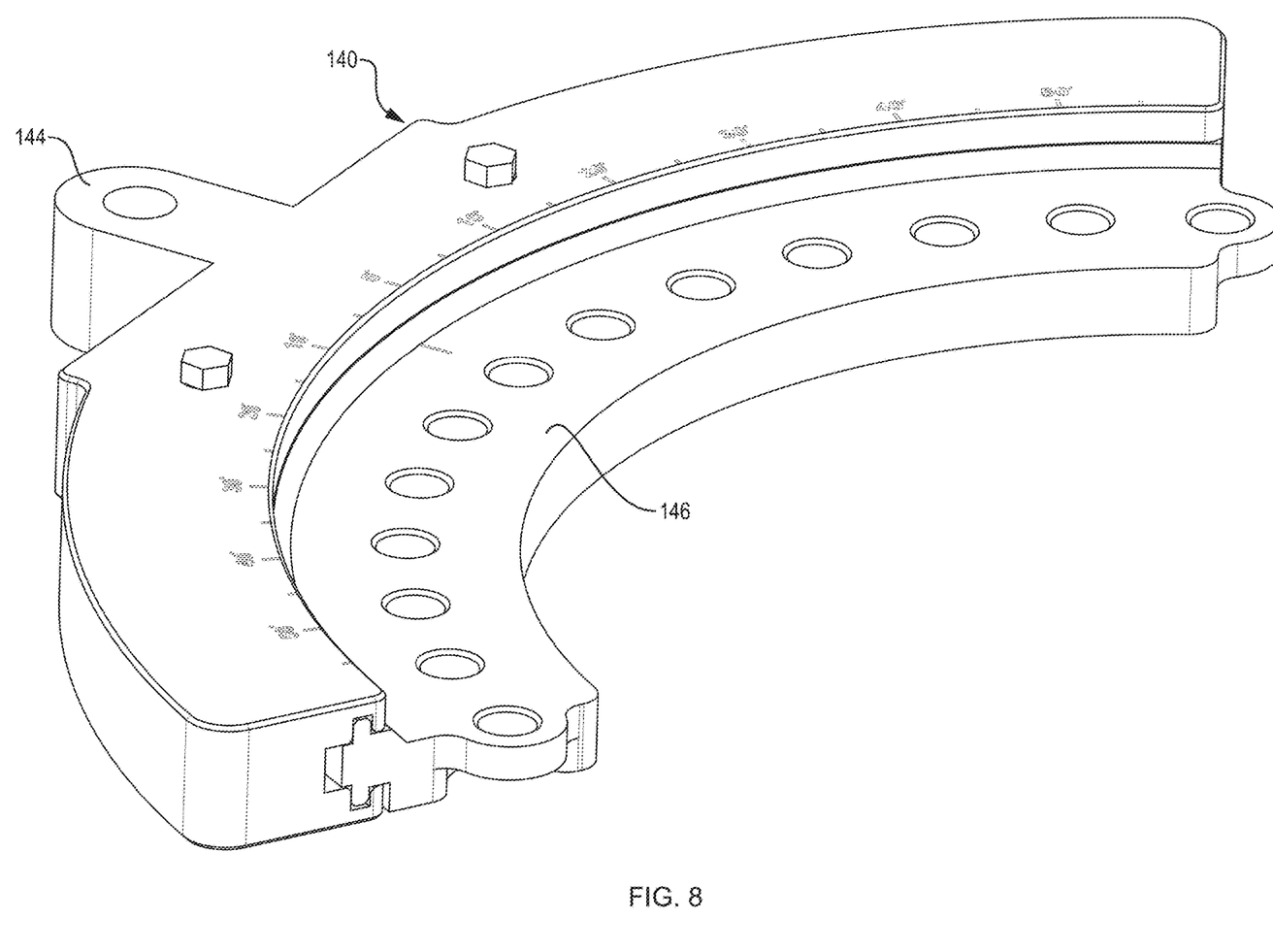
FIG. 8 is a perspective detail view of the rotator of the embodiment of FIG. 2.

FIG. 8 is a perspective view of the rotator assembly 140 of the embodiment of FIG. 2. The rotator assembly 140 comprises a mounting adapter 144 having structure for attaching the rotator assembly to the first base 104 as shown in FIG. 2. A rotating inner part 146 is secured in a rotating relationship along a groove or track in the mounting adapter as shown in FIG. 8. Note the angular gradations on the mounting adapter 144 and the hash mark on the rotating inner part 146 that assists a user in locating the rotating inner part 146 in a desired orientation. Also note the mounting structures in the rotating inner part for adjustably attaching the linking member that is shown in FIG. 2.

Figure 9:
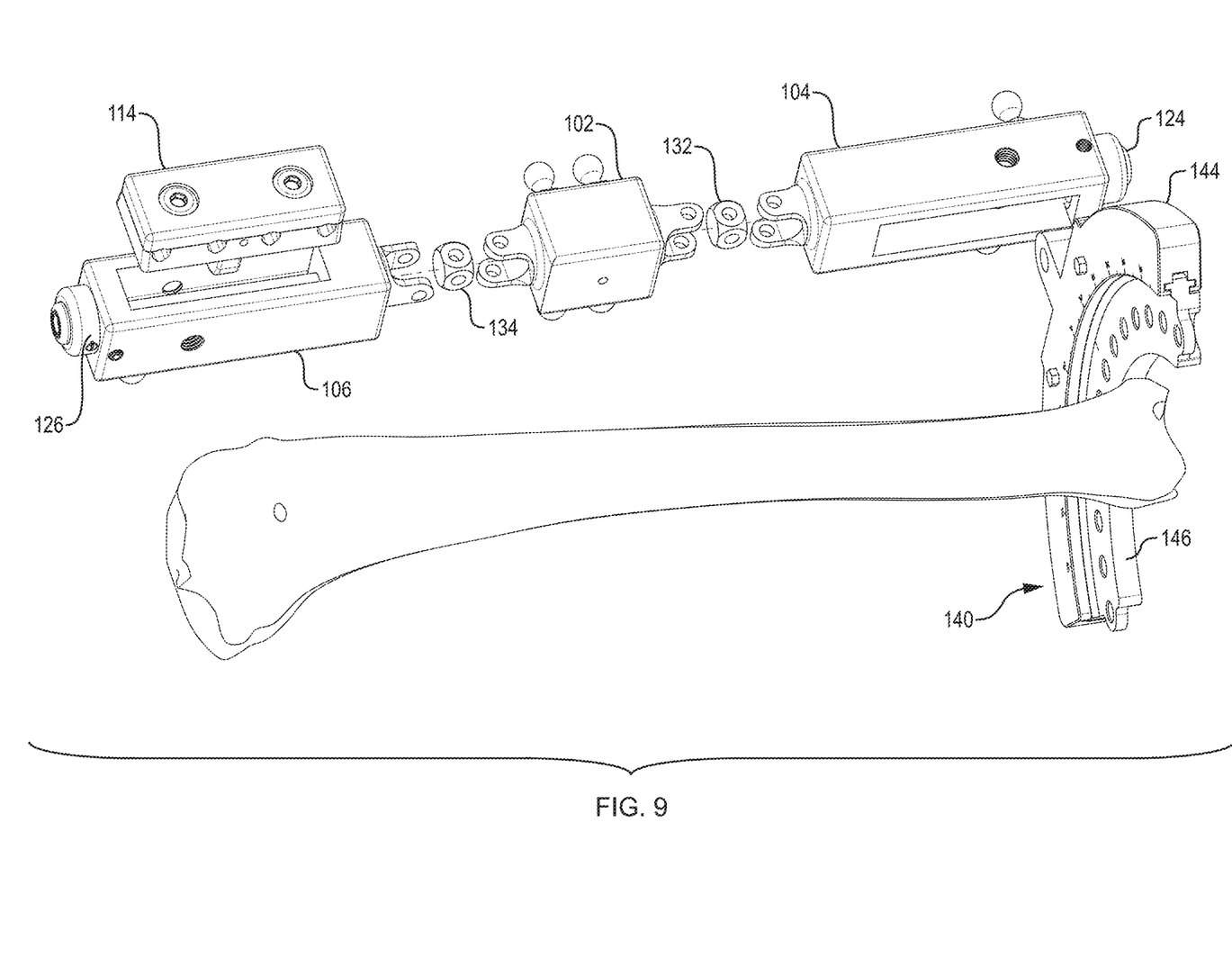
FIG. 9 is an exploded view of the embodiment of FIG. 2.

FIG. 9 is an exploded view of the embodiment of FIG. 2 and shows additional components that are not visible in the view of FIG. 2. Like with the first embodiment, a first cross 132 is disposed between the central body 102 and the first base 104, and is part of the first universal joint 108. A second cross 134 is disposed between the central body 102 and the second base 106, and is part of the second universal joint 110.

The rotator assembly 140 is in sliding communication with the first base 104 and is translated along the longitudinal axis of the first base by adjusting the first axial adjustment screw 124. The second bone attachment base 114 is in sliding communication with the second base 106 and is translated along the longitudinal axis of the second base by adjusting the second axial adjustment screw 126.

Figures 10, 11:
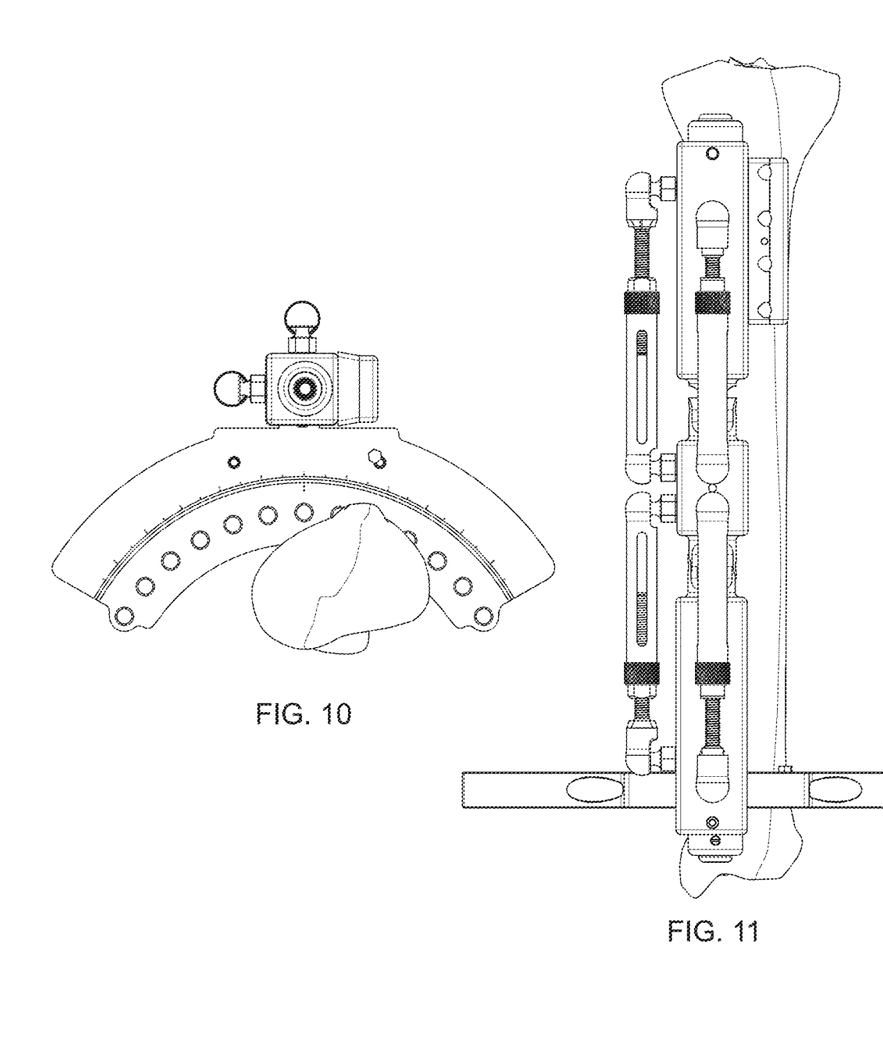
FIG. 10 is a side elevation of the embodiment of FIG. 2.
FIG. 11 is a rear elevation of the embodiment of FIG. 2.
Figure 12:
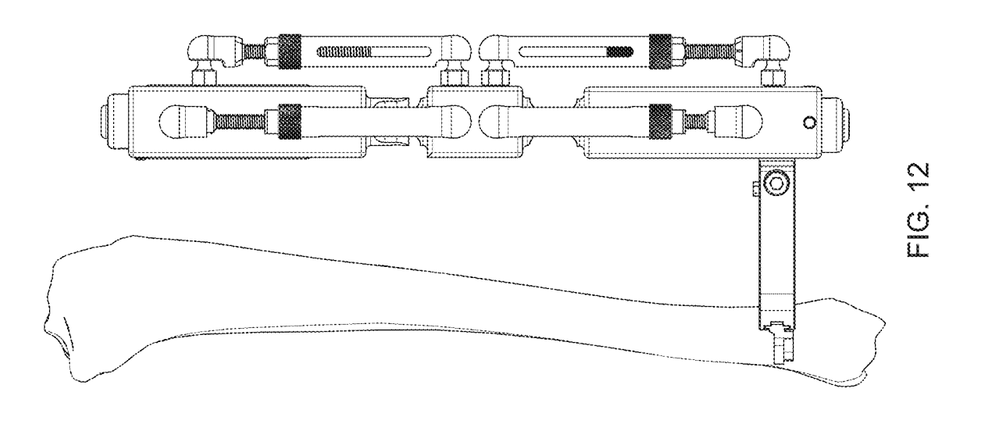
FIG. 12 is a plan view of the rotator assembly of the embodiment of FIG. 2.

FIGS. 10-12 show the side elevation, rear elevation, and plan view of the UEF of FIG. 2 respectively.

Figure 13:
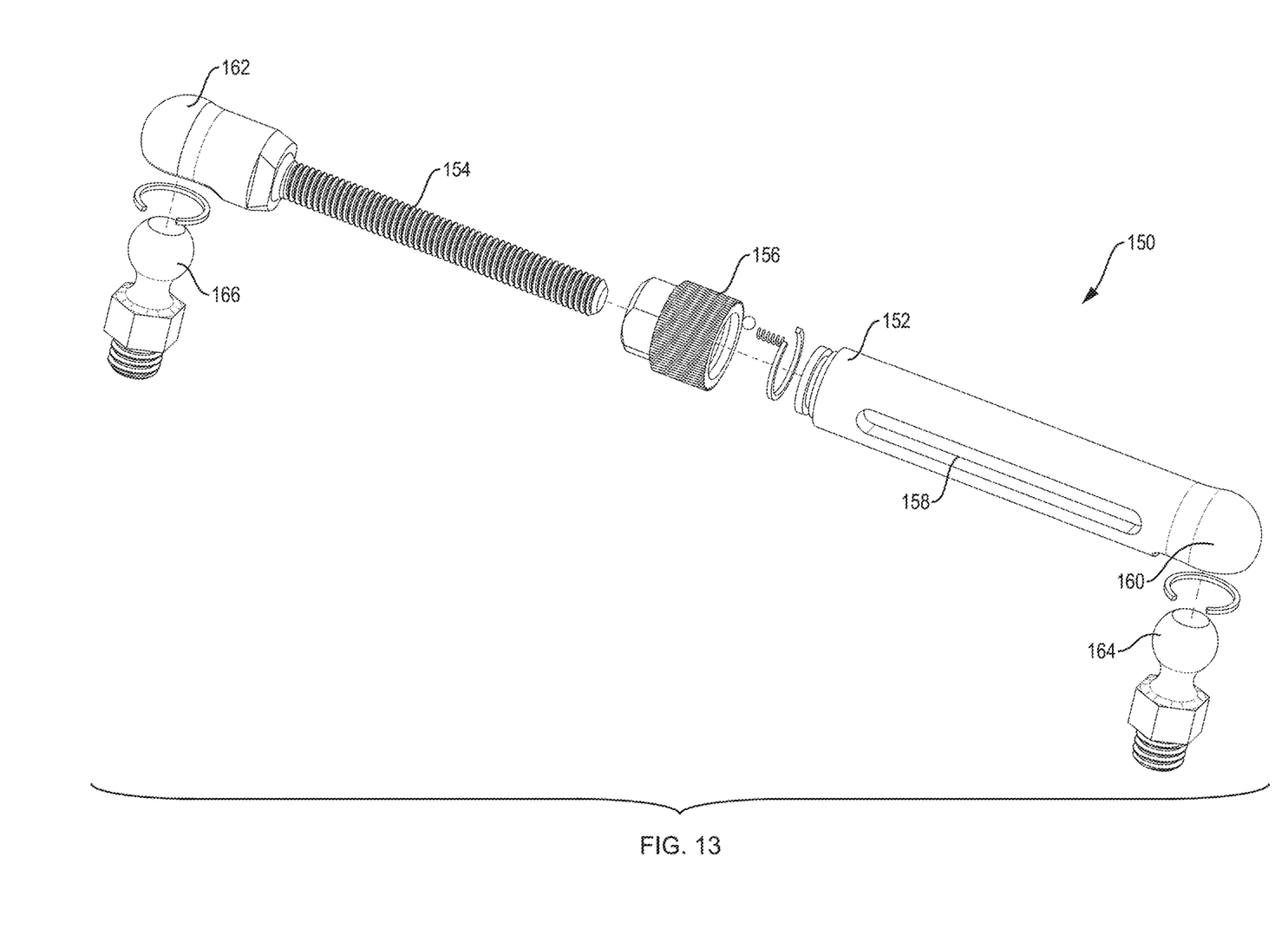
FIG. 13 is an exploded perspective view of an angulation adjustment screw assembly.

FIG. 13 is an exploded perspective view of an angulation adjustment screw 150, and shows the components and details of any of the first through fourth angulation adjustment screw assemblies 116-122. A joint is disposed at the first and second ends of the angulation adjustment screw assemblies, and the particular joint shown in FIG. 13 is a ball and socket joint. The joint could also be a universal joint, not shown. The angulation adjustment screw assembly 150 comprises a barrel 152, a threaded rod 154, and an adjustment nut 156 that engages the barrel 152 and threaded rod 154. Rotating the adjustment nut 156 adjusts the overall length of the angulation adjustment screw assembly. The barrel comprises at least one window 158 through which an operator can see an end of the threaded rod 154, or an indicator structure connected to the threaded rod. Preferably, length gradations are applied to the barrel 152 that assist an operator in adjusting the overall length of the angulation adjustment screw assembly by matching the position of the end of the threaded rod with a desired gradation.

For a ball and socket joint, a first pin receiver 160 is disposed on one end of the barrel 152 and is adapted to receive a first pin 164. A second pin receiver 162 is disposed on one end of the threaded rod 154 and is adapted to receive a second pin 166. As shown in FIG. 1, first and second pins, which are not numbered in FIG. 1, are attached to the central body 102 and one of the first base 104 or the second base 106.

Next, a method to control the movement of the UEF to correct a bone deformity is presented. The method requires the inverse kinematic control of the kinematic structure, with respect to an arbitrary, user-defined reference point. The solution to the problem is an algorithm, which allows computer-based evaluation and supplies the user with the required settings that achieve desired position and orientation. The solution should also consider the limitations of motion of the given device.

The inputs to the expected algorithm are the dimensions of the UEF, the location and the orientation of two fractured bone segments, as well as an initial position and orientation and a target position and orientation. The expected output is the set of adjustment settings to change the current position to a desired target position. The settings include, but are not limited to, settings for rotation adjustment screws, axial adjustment screws, and for the rotator assembly. The transition from initial to target position should follow a trajectory with a user-defined number of intermediate steps.

The method includes the two embodiments of the UEF, the basic version with five degrees of freedom (DOF) as shown in FIG. 1 and the extended version with the full range of six DOF as shown in FIG. 2.

The modeling and simulation of kinematic structures used as manipulators have always been a central issue in the area of robotics, as this forms the basis for both research and the implementation of robotic systems. While the matter is of highly complex nature, the modeling process itself is often more of a necessary but recurrent prerequisite, rather than being of key interest. Especially concerning dynamic systems such as manipulators, the area of robotics has developed several unified methods for their kinematic description and the calculation of dynamic forces. These methods simplify both documentation and implementation of complex linear and non-linear systems. Furthermore, as general requirements in robotics are often of similar nature, these commonly used methods are well-suited for numeric implementation in real-time systems.

Figure 14:
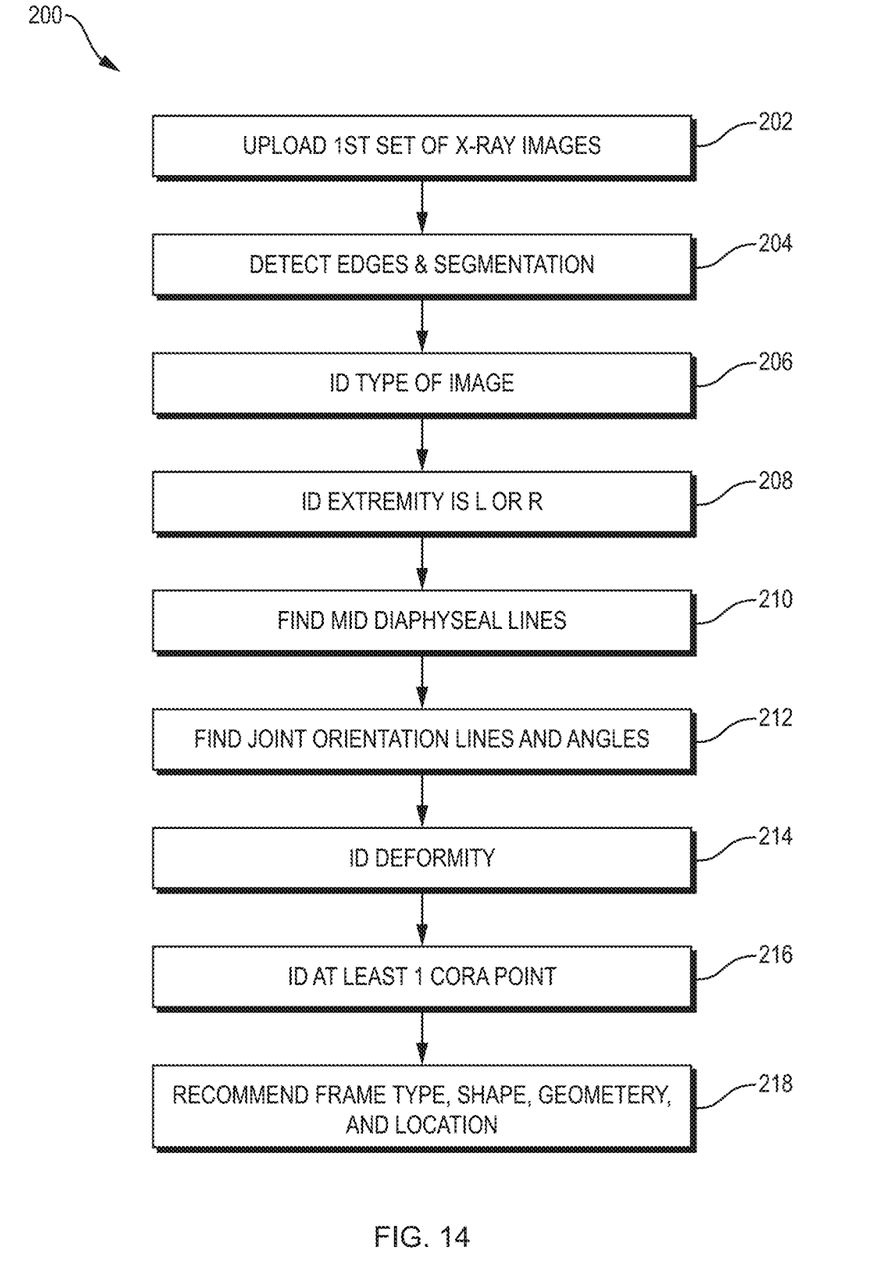
FIG. 14 is a flow chart of a method of correcting a bone deformity with a UEF, pre-surgery.

Turning to FIG. 14, a method 200 of correcting a bone deformity with a unilateral external fixator comprises the steps of first uploading a first set of x-ray images of the bone deformity taken prior to surgery without the fixator to a computer software program 202. Then, automatically, with the computer software program, perform the steps of detecting bone segment edges and segmentation 204, identifying whether an x-ray image is a coronal plane image, or a sagittal plane image 206, identifying whether the extremity is a left or right extremity 208, finding mid diaphyseal lines for each bone segment 210, finding joint orientation lines and joint orientation angles 212, identifying the deformity and bone segment positions 214, identifying at least one cora point 216, and recommending a frame type, shape, osteotomy level, and geometry for the bone deformity to be corrected using the unilateral external fixator 218. Note that, as used in this specification and in the claims, the term "cora" means "center of rotation of angulation."

Figure 15:
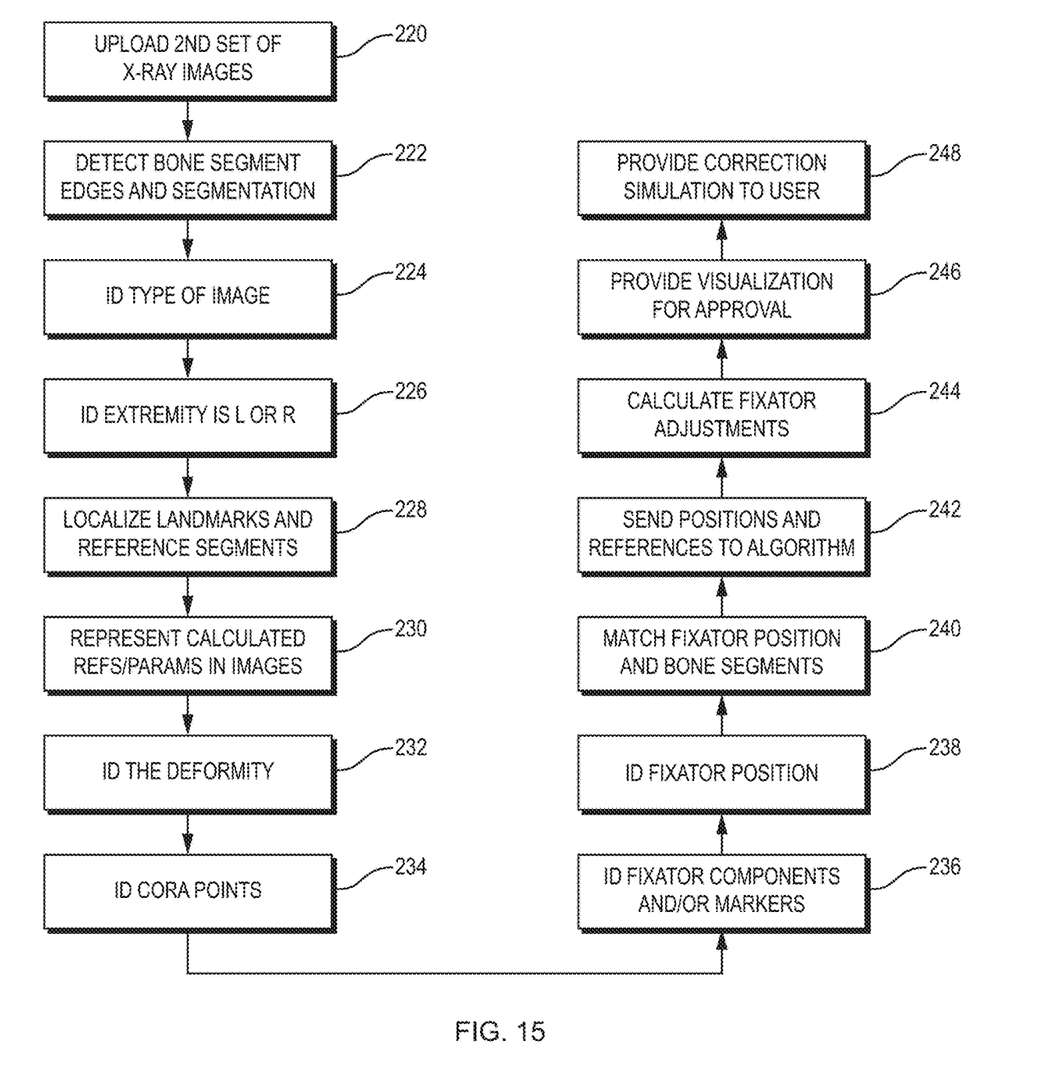
FIG. 15 is a flow chart continuing the method of FIG. 14 post-surgery.

After surgery, the method continues with the steps shown in FIG. 15. The next step is uploading a second set of x-ray images with the fixator taken after surgery to the computer software program 220.

Then, automatically, with the computer software program, perform the steps of detecting bone segment edges and segmentation 222, identifying whether an x-ray image is a coronal plane image, or a sagittal plane image 224, identifying whether the extremity is a left or right extremity 226, localizing landmarks and reference segments in the coronal plane image and/or the sagittal plane image 228, representing the calculated angles in the coronal plane image and/or in the sagittal plane image 230, identifying the deformity and bone segment positions 232, identifying cora points 234, identifying fixator components and/or markers 236, identifying fixator geometric positions 238, matching fixator positions and bone segment positions 240, sending bone segment position parameters and fixator references with necessary correction parameters, such as translation, angulation, distraction/compression and/or rotation requirements entered by a user or surgeon to a correction algorithm of the computer software program 242, calculating fixator adjustments necessary to align bone segments 244, providing visualization of aligned bone segments in two and three dimensions and proposed fixator positions for user approval 246, and providing a correction simulation and/or animation with modeled three dimensional bone and fixator model to a user for correcting the bone deformity with the unilateral external fixator 248.

The computer software program can be an artificial intelligence ("AI") application. An input prompt for the AI application can comprise the first set of x-ray images and the second set of x-ray images.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

TABLE OF REFERENCE NUMBERS

| Reference Number | Description |
|---|---|
| 100 | unilateral external fixator assembly |
| 102 | central body |
| 104 | first base |
| 106 | second base |
| 108 | first joint |
| 110 | second joint |
| 112 | first bone attachment base |
| 114 | second bone attachment base |
| 116 | first angulation adjustment screw assembly |
| 118 | second angulation adjustment screw assembly |
| 120 | third angulation adjustment screw assembly |
| 122 | fourth angulation adjustment screw assembly |
| 124 | first axial adjustment screw |
| 126 | second axial adjustment screw |
| 128 | lower bone mockup |
| 130 | upper bone mockup |
| 132 | first cross |
| 134 | second cross |
| 140 | rotator assembly |
| 142 | linking member |
| 144 | mounting adapter |
| 146 | rotating inner part |
| 150 | angulation adjustment screw assembly |
| 152 | barrel |
| 154 | threaded rod |
| 156 | adjustment nut |
| 158 | window |
| 160 | first pin receiver |
| 162 | second pin receiver |
| 164 | first pin |
| 166 | second pin |
| 200 | method of correcting a bone deformity with a UEF |
| 202 | upload first set of x-ray images |
| 204 | detect edges and segmentation |
| 206 | identify type of image |
| 208 | identify whether the extremity is left or right |
| 210 | find mid diaphyseal lines |
| 212 | find joint orientation lines and angles |
| 214 | identify the deformity |
| 216 | identify at least one cora point |
| 218 | recommend frame type, shape, geometry, and location |
| 220 | upload second set of x-ray images |
| 222 | detect bone segment edges and segmentation |
| 224 | identify type of image |
| 226 | identify whether the extremity is left or right |
| 228 | localize landmarks and reference segments |

-continued

TABLE OF REFERENCE NUMBERS

| Reference Number | Description |
| --- | --- |
| 230 | represent calculated positions in images |
| 232 | identify the deformity |
| 234 | identify cora points |
| 236 | identify fixator components and/or markers |
| 238 | identify fixator position |
| 240 | match fixator position and bone segments |
| 242 | send positions and references to correction algorithm |
| 244 | calculate fixator adjustments |
| 246 | provide visualization for approval |
| 248 | provide correction simulation to user |

The invention claimed is:

1. A unilateral external fixator comprising:
   a central body;
   a first base in operative communication with the central body via a first joint disposed on a central body first side; the first joint comprising one of:
      a ball and socket joint; or
      a universal joint comprising a first cross;
   a first angulation adjustment screw assembly connected at a first end to the central body and connected at a second end to the first base;
   a third angulation adjustment screw assembly connected at a first end to the central body at a position orthogonal to that of the first angulation adjustment screw assembly and connected at a second end to the first base at a position orthogonal to that of the first angulation adjustment screw assembly;
   a first axial adjustment screw assembly comprising a longitudinal axis that is disposed on a longitudinal axis of the first base that adjusts translation of one of a first bone attachment base and a rotator assembly along the longitudinal axis of the first base;
   a second base in operative communication with the central body via a second joint disposed on a central body second side opposite the central body first side; the second joint comprising one of:
      a ball and socket joint; or
      a universal joint comprising a second cross;
   a second angulation adjustment screw assembly connected at a first end to the central body and connected at a second end to the second base;
   a fourth angulation adjustment screw assembly connected at a first end to the central body at a position orthogonal to that of the second angulation adjustment screw assembly and connected at a second end to the second base at a position orthogonal to that of the second angulation adjustment screw assembly; and
   a second axial adjustment screw assembly comprising a longitudinal axis that is disposed on a longitudinal axis of the second base that adjusts translation of a second bone attachment base along the longitudinal axis of the second base.

2. The unilateral external fixator of claim 1, further comprising respective angulation adjustment screw assembly joints disposed at each of the first end and second end of each angulation adjustment screw assemblies that connect the respective angulation adjustment screw assemblies to the central body and a respective first base or second base, each angulation adjustment screw assembly joint comprising either a ball and socket joint or a universal joint.

3. The unilateral external fixator of claim 1, wherein
   the first bone attachment base is connected to the first base at a position distinct from the first angulation adjustment screw assembly and the third angulation adjustment screw assembly; and
   the second bone attachment base is connected to the second base at a position distinct from the second angulation adjustment screw assembly and the fourth angulation adjustment screw assembly.

4. The unilateral external fixator of claim 1, the rotator assembly comprising a semi-circular or circular rotator assembly fixed to and in sliding communication with the first base.

5. The unilateral external fixator of claim 4, wherein the rotator assembly comprises:
   a mounting adapter fixed to and in sliding communication with the first base;
   a rotating inner part secured in a rotating relation with the mounting adapter; and
   a linking member adjustably secured to the rotating inner part.

* * * * *